(12) United States Patent
Simeonov

(10) Patent No.: US 10,572,459 B2
(45) Date of Patent: Feb. 25, 2020

(54) HIGH-ACCURACY DATA PROCESSING AND MACHINE LEARNING TECHNIQUES FOR SENSITIVE DATA

(71) Applicant: Swoop Inc., Cambridge, MA (US)

(72) Inventor: Simeon Simeonov, Lincoln, MA (US)

(73) Assignee: Swoop Inc., Cambridge, MA (US)

( * ) Notice: Subject to any disclaimer, the term of this patent is extended or adjusted under 35 U.S.C. 154(b) by 0 days.

(21) Appl. No.: 16/255,024

(22) Filed: Jan. 23, 2019

(65) Prior Publication Data

US 2019/0227999 A1  Jul. 25, 2019

Related U.S. Application Data

(60) Provisional application No. 62/620,679, filed on Jan. 23, 2018.

(51) Int. Cl.

| | |
|---|---|
| G06F 16/00 | (2019.01) |
| G06F 16/215 | (2019.01) |
| G06F 16/2453 | (2019.01) |
| G06N 20/00 | (2019.01) |
| G06F 16/22 | (2019.01) |
| G06F 21/62 | (2013.01) |
| G06F 16/21 | (2019.01) |

(52) U.S. Cl.
CPC ......... *G06F 16/215* (2019.01); *G06F 16/212* (2019.01); *G06F 16/2246* (2019.01); *G06F 16/24542* (2019.01); *G06F 21/6245* (2013.01); *G06F 21/6254* (2013.01); *G06N 20/00* (2019.01)

(58) Field of Classification Search
CPC ............... G06F 16/215; G06F 16/2246; G06F 21/6254; G06F 21/60; G06F 16/212; G06F 16/6245
USPC ........................................................ 707/692
See application file for complete search history.

(56) References Cited

U.S. PATENT DOCUMENTS

| | | | |
|---|---|---|---|
| 7,269,578 B2 * | 9/2007 | Sweeney ............. | G06F 21/6245 705/74 |
| 9,754,129 B2 * | 9/2017 | Yamaoka ............ | G06F 21/6254 |
| 2010/0332537 A1 * | 12/2010 | El Emam ............ | G06F 16/2457 707/771 |
| 2014/0201847 A1 * | 7/2014 | Ito ....................... | G06F 21/6254 726/26 |
| 2018/0103084 A1 * | 4/2018 | Auvenshine .......... | G06F 16/215 |
| 2018/0137149 A1 * | 5/2018 | Hsiao .................... | G06F 16/215 |

* cited by examiner

*Primary Examiner* — Vincent F Boccio
(74) *Attorney, Agent, or Firm* — Goodwin Procter LLP

(57) ABSTRACT

Flexible, high-accuracy data processing techniques and accompanying systems avoid criticality in intermediate computations through intelligent, low cost sanitization of data operations. A data processing operation including one or more plans is received, with each plan having a data operation described as a tree based-structure. The plans that are determined to create criticality on execution are sanitized by transforming the plan itself, ancestors, and/or children of the plan. Determining whether execution of a plan creates criticality is based on the determination of whether a set of criticality conditions includes data signals that are associated with the plan. After sanitization, the data processing operation can be fully executed without criticality arising in intermediate operations.

24 Claims, 5 Drawing Sheets

HIGH-ACCURACY DATA PROCESSING AND MACHINE LEARNING TECHNIQUES FOR SENSITIVE DATA

CROSS-REFERENCE TO RELATED APPLICATION

This application claims priority to and the benefit of U.S. Provisional Patent Application No. 62/620,679, filed on Jan. 23, 2018, the entirety of which is incorporated by reference herein.

FIELD OF THE INVENTION

The present disclosure relates generally to electronic data processing, and, more specifically, to systems and methods for flexible, high-accuracy data processing of sensitive data that avoid criticality in intermediate computations.

BACKGROUND

In a world increasingly shaped by analytics, data science (DS), machine learning (ML) and artificial intelligence (AI) techniques that are readily available, value and competitive differentiation often stem from the data that is available for processing. In many domains, for reasons including but not limited to business, operational, legal, regulatory, security and privacy concerns, it is desirable to guarantee certain invariants during data processing.

For example, the HIPAA Privacy Rule refers to protected health information (PHI) as "individually identifiable health information." Entities that handle PHI are subject to a number of business and operational restrictions. In order to avoid such restrictions, it may be desirable to assert that, if data inputs are not PHI, then at no point during processing will PHI be created. There are similar examples in other domains involving potentially sensitive information including but not limited to identifiable information (II) (a superset of the traditionally narrow personally identifiable information (PII)) as well as consumption data (be that of physical or virtual goods, services or content), location data, communications data, social graph information, government records, vehicle telematics, blockchain-related information, etc.

When processing potentially sensitive data, there are a number of conventional approaches to ensuring the absence of criticality involving a combination of three techniques. (1) Data sanitization: Ahead of data processing, the data is pre-processed to ascertain various properties such as a certain level of k-anonymity or the absence of certain type of fields in the data. This may be combined with a safe harbor-type attestation by the entities involved in processing the data. (2) Expert determination: An expert uses statistical or scientific principles to ascertain with high degree of certainty that criticality has not been achieved and/or will not be achieved during data processing. (3) Externalizing critical operations: Operations that involve criticality are executed elsewhere, often at a separate business entity.

Each approach has its drawbacks. For example, data sanitation is typically done in preparation of performing multiple operations on the data. As a result, the data is typically over-sanitized via omission, redaction, randomization, coding and related techniques. Further, this data sanitization affects the quality of output of data processing operations such as training machine learning and AI models. Expert determination focuses on the data being processed as well as the systems, controls and workflows for doing the data processing. It is usually the case that a sample of data is analyzed by the expert(s) to reach a determination. When the data materially changes in either breadth or depth, a new expert determination is required. This introduces cost and friction as new data may not be readily usable until a new determination is achieved. Externalizing critical operations adds cost and complexity.

What is needed are techniques and supporting systems that avoid criticality and avoid these and other drawbacks inherent in current approaches.

BRIEF SUMMARY

In one aspect, a computer-implemented method comprises the steps of receiving a data processing operation comprising a plurality of plans, each plan comprising a data operation having a tree-based structure, wherein the data processing operation, when ordinarily executed, creates criticality at least in intermediate operations; determining, for each plan, whether execution of the plan creates criticality, wherein the determining comprises identifying one or more data signals associated with the plan and determining whether a set of criticality conditions includes one or more of the data signals; sanitizing each plan that, when executed, creates criticality, wherein the sanitizing comprises traversing the tree-based structure of the plan and transforming the plan, an ancestor of the plan, and/or a child of the plan such that execution of the plan does not create criticality; and following the sanitizing, executing each plan of the data processing operation, wherein execution of the data processing operation following the sanitizing no longer creates criticality in intermediate operations. Other aspects of the foregoing include corresponding systems configured to execute the computer-implemented method, and non-transitory computer-readable media storing instructions embodying the computer-implemented method.

In one implementation, data pools on which the data processing operation depends are individually absent of criticality.

In another implementation, sanitizing a plan comprises: (a) determining a cost to remove from the plan each data signal associated with the plan that is included in the set of criticality conditions; and (b) identifying a permutation of the data signals from step (a) that, when removed from the plan, sanitize the plan at a lowest cost compared to other permutations of the data signals.

In yet another implementation, sanitizing a plan comprises applying to the plan at least one transform operation in a set of transform operations, the set of transform operations being associated with (1) a data field in the plan to be transformed and (2) a data signal to be removed from the plan. The set of transform operations can include (1) a self transform in which a plan is transformed without transforming children of the plan, (2) an up transform in which each ancestor of the plan is transformed without transforming children of the plan, and/or (3) a root transform in which one or more transformations are reverted. Sanitizing a plan can further include performing a self transform on a name of the data field, the self transform comprising renaming the name of the data field in the plan to create a renamed data field in the plan. Sanitizing a plan can further include performing an up transform on a name of the data field, the up transform comprising changing, in each ancestor of the plan, each reference to the name of the data field to a reference to the renamed data field. Sanitizing a plan can further include performing a root transform on a name of the data field, the root transform comprising reverting renaming and reference changing operations performed by the self transform and up transform of the plan.

In one implementation, sanitizing a plan further comprises performing a self transform on a value of the data field, the self transform comprising applying a lossless or lossy projection to the value of the data field in the plan. Sanitizing a plan can further include performing an up transform on a value of the data field, the up transform comprising identifying operations in ancestors of the plan that are potentially negatively affected by the self transform on the value of the data field. Sanitizing a plan can further include performing a root transform on a value of the data field, the root transform comprising either (1) reverting a lossless projection applied by the self transform of the plan, (2) no operation, or (3) producing a set of values associated with a lossy projection applied by the self transform of the plan.

In another implementation, execution of a first plan comprises training a data model, wherein the first plan is sanitized by applying a first transformation to inputs that are used for training the data model, and wherein execution of a second plan comprises: using the data model to provide a prediction; and applying the first transformation to inputs that are used by the data model to provide the prediction.

The details of one or more implementations of the subject matter described in the present specification are set forth in the accompanying drawings and the description below. Other features, aspects, and advantages of the subject matter will become apparent from the description, the drawings, and the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
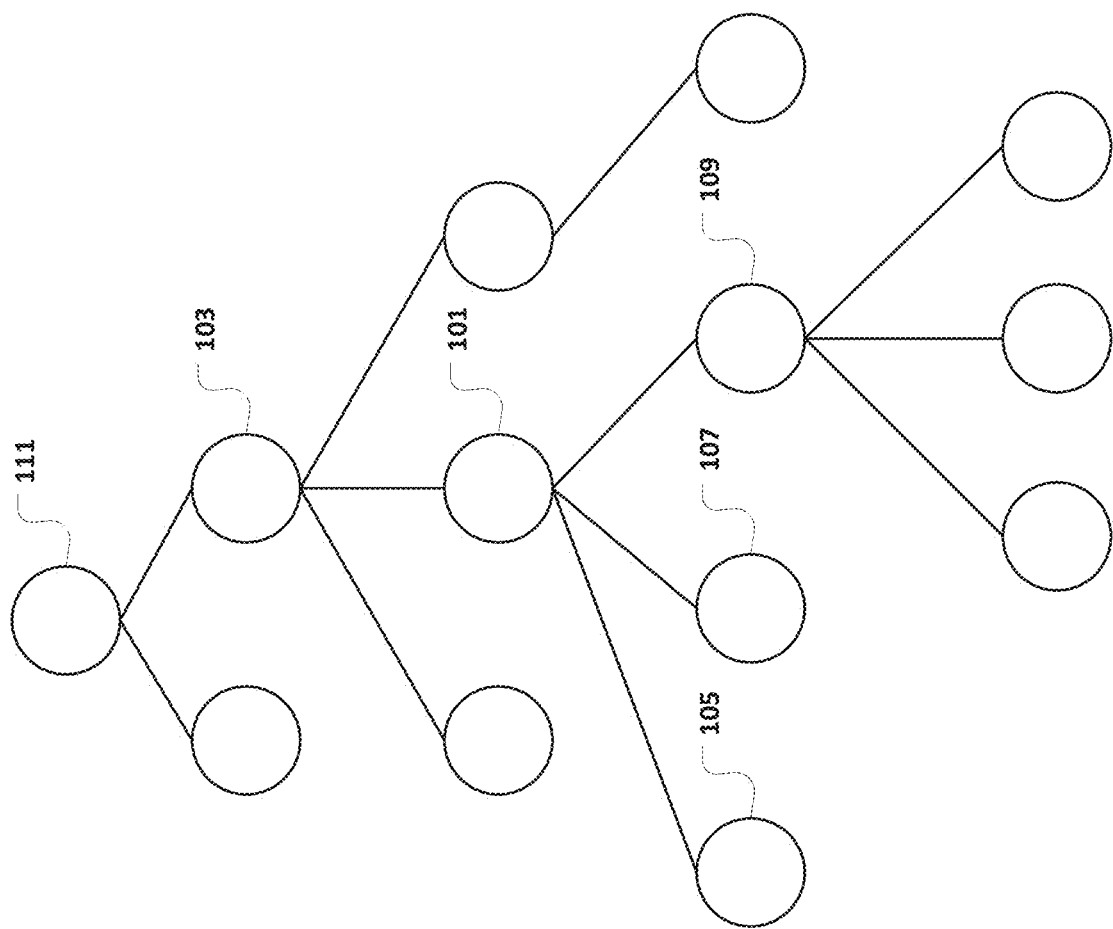
FIG. 1 depicts an example tree-based structure for data processing sub-operations.

Described herein are systems and methods for facilitating flexible, high-accuracy data processing that avoids criticality in intermediate computations, regardless of how criticality is defined in a given context. In general, the techniques and supporting systems maintain sensitive data in separate "execution environments" and orchestrate tasks across those execution environments to perform operations that would have otherwise caused criticality had the data not been separated and/or processed using conventional techniques. The present disclosure therefore provides techniques for analyzing data that have not previously been described in the art, and discloses new and inventive methods for avoiding criticality in intermediate data processing operations.

In various embodiments, these systems and methods perform light data transformations, which typically involve no omission/redaction/randomization. As a result, the quality of output of data processing operations is typically unaffected. Further, in the few cases where the data transformations require omission/redaction/randomization or related processes, such transformations can be tuned to minimize the impact on the quality of output of the particular operation(s). Moreover, aspects of the presently disclosed techniques provide invariant guarantees for criticality avoidance that are based on systems, controls and workflows for data processing and, to a great extent, independent of the specifics of the data. Therefore, changes considered material using conventional approaches have no impact. Lastly, the techniques and supporting systems facilitate the restructuring of data processing tasks that would otherwise create criticality into a coordinated set of sub-operations that avoid criticality and produce either identical or practically equivalent output.

The term "criticality," as used herein, refers to the point at which some volume (breadth) and/or specificity (depth) of data leads to violating a desirable invariant. For example, health data with no identifiability is not PHI. PII by itself is also not PHI. However, if PII were added (or could reasonably be added or inferred) to health data, then the result is PHI. If the desirable invariant is "no PHI," the data (and system involved in storing, transmitting and processing it) becomes critical at the point of combining the PII with the health data. However, the techniques described herein can equally apply to alternative definitions of "criticality" in different contexts.

The term "sanitize" and its variants, as used herein, refers to transforming or otherwise altering a data processing operation such that execution of the operation avoids criticality.

The term "data," in addition to its commonly understood definitions, may have different meanings and representations depending on context. For example:

Metadata: There is a significant semantic difference between the random number 51120 and the same number as a numeric encoding of the social security number 000-05-1120. A value of "true" for a boolean column of data, by itself, carries no meaning related to criticality. If the name of the data column containing this value is "bool_123," that by itself carries no additional meaning. However, if the name of the column is "has_cancer," the situation may be quite different per HIPAA.

Data: Sometimes data carries implicit meaning. To those skilled in the domain of health data, a data value of "S42.414A," with no additional context, would reasonably look like an ICD-10-CM code for nondisplaced simple supracondylar fracture without intercondylar fracture of right humerus, initial encounter for closed fracture. To a human expert, a data column with similar values will be perceived to include ICD10-related health data even if the column name is something as health-independent as "special_value_7." On the contrary, other things being equal, neither "123" nor "Ee0VXfyyb49/Hlb9uej21A--" would carry any meaning to the same expert, yet they could represent the exact same ICD10 code. In the first case, the mapping is via a lookup table. In the latter case, it is the result of encryption and base 64 encoding.

Context: Consider "percentage=100" as the output of a data operation. In the context of the query "What percentage of people named Kalikashvili aged over 80 in zip code 10011 have cancer?", 100% may very likely be PHI per HIPAA, as the context adds implicit data fields with zip code, last name and age range as well as effectively changes the name of the result from percentage to "percentage_with_cancer."

Code and other assets: The context described above could be implicit in SQL defining a query.

The techniques described herein avoid criticality by breaking up a data processing operation into a set of coordinated tasks, where some tasks perform (potentially invertible) data transformations that remove and, in some cases, re-apply, data semantics so as to produce either identical or practically equivalent output to the one expected from the given data processing operation.

In one implementation, a data processing operation includes one or more sub-operations on data. Any particular sub-operation on data can be described by a recursive, tree-based data structure referred to herein as a "plan." Plans can include any form of computation, including query execution plans in databases, dataflow-based execution plans, and abstract syntax trees (ASTs). A plan can have a parent plan and children that are also plans. A plan without a parent is a root plan. A plan with children is an inner plan. A plan without children is a leaf plan. FIG. 1 illustrates one example of a tree-based structure of plans. Taking plan 101 as the plan of interest, plan 101 has a parent plan 103 and three child plans 105, 107, and 109. The parent plan 103 is an ancestor plan of plan 101, as is plan 111. Plan 111 is a root plan, and plans 105 and 107 are leaf plans.

Plans can be categorized into subtypes as needed, describing everything from storing and manipulating data via computer systems to a human expert receiving and replying to an email. The mixture of "online" and "offline" plan elements can be used when considering data operations that combine automated and human sub-operations.

The initial state of the system is not critical. In practical terms, this means that data is partitioned into one or more logical pools with a sufficient level of inaccessibility, independence, separation, isolation, etc. by whatever technical means necessary, to guarantee the absence of criticality. For example, one pool might contain health data and some non-identifiable personal information, another pool might contain PII, a third pool might contain department of motor vehicles (DMV) information, and a fourth pool might contain online content consumption information. The embodiment of pools is orthogonal to the presently described technology. Such data pools can include files, databases, tables, collections, individual objects/rows/documents in databases, or other structuring of data used to satisfy the initial non-criticality condition. Any publicly-available or reasonably easy to acquire, within the relevant constraints of the definition of criticality, data that could be linked or joined to the foregoing data can be considered implicitly available in all pools.

A plan is "sanitized" when its execution avoids criticality. Because the initial state of the system is non-critical, all leaf plans are sanitized. Without loss of generality, it can be assumed that the creation of criticality at an inner plan in a plan representation is due to the attributes of the children of the inner plan.

A plan is executed by a "task." Tasks encapsulate the general notion of doing anything in an appropriate execution environment, from a cloud platform to the office of a human. Tasks can have dependencies that form a directed acyclic graph (DAG). Therefore, producing the result of a task may require producing the results of dependent tasks first. Net of this constraint, the disclosed techniques apply to any task execution ordering.

If a child plan cannot be executed in the same task as its parent, the child plan can be executed in a different task and, in the parent plan, the child is replaced with a plan that describes the result of that task. In one embodiment, this captures a combined requirement related to both system operational constraints as well as constraints for avoiding data criticality, e.g., that data of domain X and data of domain Y cannot be processed together in the same execution environment.

In some implementations, the system assumes that the result of executing the root plan is not critical. This is a practical assumption, as the goal is to avoid criticality in intermediate computation. By definition, if a critical result is sought, no change in how the result is achieved can eliminate criticality in a system.

Figure 2:
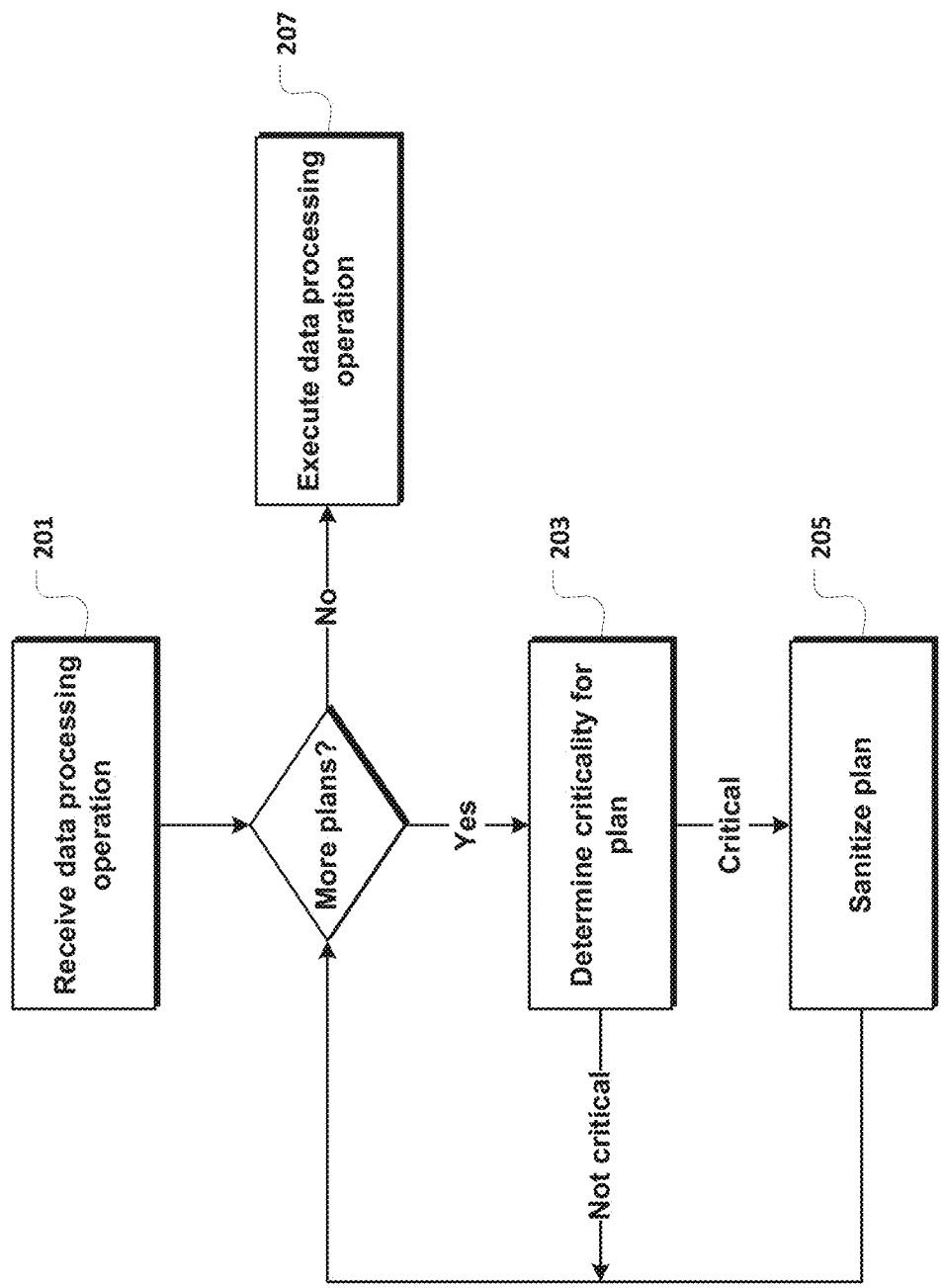
FIG. 2 depicts an implementation of a method for high-accuracy data processing that avoids criticality in intermediate operations.

FIG. 2 depicts a high-accuracy data processing that avoids criticality in intermediate computations. In Step 201, a computing system receives a data processing operation that is composed of one or more plans. Prior to any sanitization of the individual plans, the data processing operation creates criticality in its intermediate operations and, in some instances, produces a critical result. In Step 203, for each plan, the computing system determines whether execution of such plan creates criticality. This can determination can include, for example, identifying the data signals that are associated with the plan and determining whether the data signals are included in a set of criticality conditions. If a plan is identified as creating criticality on execution, the plan is sanitized in Step 205. In some implementations, sanitizing the plan is performed by traversing the tree-based structure of the plan and transforming, as needed, the plan itself, children and/or ancestors. Once there are no further plans requiring sanitization and the data processing operation can be executed without creating criticality in intermediate operations, the plans in the operation are executed, in Step 207. The foregoing steps are described in further detail, below.

To sanitize an unsanitized inner plan whose children are sanitized, one or more of its children must be transformed, which may also require changes to ancestor plans. This operation can be generalized as three separate transformations: (1) Self transform: this operation transforms a plan, leaving its children unchanged; (2) Up transform: this operation transforms each plan ancestor, leaving its children unchanged, to propagate any changes introduced by the self transformation; and (3) Root transform: this operates as the inverse (in a casual, not mathematical sense) of the up transform, and is used to potentially revert transformations required by sanitization and make the result of plan execution usable in an appropriate context.

Each of the above transformations takes as input a plan and returns as output a plan. No-operations (also known as "no-ops") behave as identity[plan]. The general algorithm for sanitizing a plan, in Scala-inspired pseudocode, is provided below. Without loss of generality, the pseudocode assumes an immutable plan and, hence, postOrderTraversal( ) must take into account the effect of up transformations. The algorithm depends on two situation and implementation specific functions: "isSanitized," which determines whether a plan is sanitized, and "sanitization," which, given an unsanitized plan, attempts to return sanitization transformation functions or fails (when criticality cannot be avoided with available sanitization strategies).

```
def sanitize(root):
    newRoot = root
    rootTransforms = [ ]
    postOrderTraversal(root).filterNot(isSanitized).foreach { plan =>
        (selfTransform, upTransform, rootTransform) =
            sanitization(plan)
        newRoot = plan.ancestors.foldLeft((plan,
            selfTransform(plan))) {
                case ((child, newChild), parent) =>
                    (parent, upTransform(parent.withChildReplaced(child,
                        newChild))
        }._2
        rootTransforms.add(rootTransform)
    }
    rootTransforms.foldLeft(newRoot) { (current, rootTransform) =>
        rootTransform(current)
    }
```

While there are many possible approaches for determining whether a plan is sanitized and for sanitizing plans based on the type of data being processed, the data domains, and the plan types, described herein, in one implementation, is a general approach adaptable to any situation. First, all data to be processed is represented in flattened tabular form, i.e., with the fields of any composite types expressed as separate columns, such that field values can be thought of as pure data with the only metadata being the fully-qualified field name, which is globally unique and may have any amount of associated metadata. Note that for simplicity, field name qualifiers as well as internal identifiers associated with calculated fields and any other intermediate data structures can be skipped, as they are implicit. This is not a restrictive assumption when considering general algorithms, as any computable data structure can be represented as a graph and any graph can be expressed in table form, e.g., as RDF triplets.

Next, there is a set of data signals DS and a set of criticality conditions CS, which is a subset of the powerset of DS. Generally, a data signal is an indicator or some other form of characterizing information associated with data. In simple embodiments, a data signal can be a data domain, e.g., DS: {health_data, identifiability} and CS: {{health_data, identifiability}}. Embodiments of a data signal include, but are not limited to, metadata of various types associated with data sources, data schemas, business rules and heuristics, as well as specific data operations. Other embodiments need not use the set-theoretic approach described herein, but will have a practically-equivalent impact on how criticality is avoided. Finally, every field of every input table is associated with two proper subsets of DS: one for the field name and one for the values of the field. Various other embodiments use probabilistic or uncertainty-based approaches to working with signals, e.g., fuzzy instead of crisp true|false membership in DS and CS.

Continuing with a pseudocode paradigm, the function ds( ) returns the data signal(s) associated with its argument(s). More specifically:

ds(set) returns the data signals for a set of potentially heterogeneous elements. The result of ds(set) is a superset of the union of results of ds applied to all members of the proper subset of the powerset of set. For example, first_name on its own may not be associated with a PII signal but {first_name, last_name, age} together may result in identifiable information and be associated with a PII signal.

ds(field.name) returns the data signals for a field with a given name independent of any field data. For example, ds("ssn") could be {identifiability}. The result can be determined via a combination of explicitly provided metadata and various rules, heuristics, natural language processing (NLP), embeddings, machine learning and AI approaches, etc.

ds(field) returns the union of the data signals for the field name and the field values. Data signals for a field name can be provided explicitly and/or implicitly determined by context, e.g., table, database, data source, etc., as well as ds(field.name). If the field is calculated, the signals for its expression are included.

ds(expression) returns the signals for an expression. Calculated fields are built from input fields using expressions. Expressions are used in plans and, just as plans, expressions are represented as trees. Leaf expressions have the following signals:

(1) Constants: { }, unless specialized by signal matching (see below).
(2) Field reference: ds(field).
(3) Zero-argument function: { }, unless specialized by signal matching.
(4) Special references, e.g., * in SQL, which denotes all fields: the result of their expanded equivalent.

Unless specialized by signal matching, a composite expression's signals are ds(expression.children). The signals for an alias expression (x as y) are ds({x, "y"}).

ds(plan) returns the data signals for a plan. Unless explicitly provided at plan creation, leaf plans have the following signals:

(1) Reading fields from an input table: ds(fields).
(2) Unless specialized by signal matching: ds(plan.expressions).

Unless explicitly provided at plan creation, and unless specialized by signal matching, inner plans have the following signals:

(1) ds(plan.expressions), when the plan has expressions.
(2) ds(plan.children) otherwise.

"Signal matching" refers to a broad set of techniques for overriding the default behavior of ds( ). Plan and expression trees are examples of approaches for identifying specific patterns in hierarchical data structures. Combined with metadata about data processing primitives, this allows for the specification of pattern matching rules for customizing signal determination. For example, the signals for hash(field, num_buckets) can be { }, provided the collision rate is sufficiently high and a rainbow table attack is not feasible; the signals for a function encrypting data can be { }; the signals for a function decrypting data can be the same as the signals for the input to the function that encrypted the data; and the signals for the expression substr(zip_code, 1, 3) can be ds(zip_code)-{identifiability}.

In addition to or instead of using pattern matching at the plan and/or expression level, signal matching may be informed by explicitly provided metadata, pre- or just-in-time-calculated statistics about data, or by other techniques.

Now, therefore:

```
def achieveCriticality(signals):
    CS contains signals
def isSanitized(plan):
    !achieveCriticality(ds(plan))
def sanitization(plan):
    noop = identity[Plan] _
    childSanitizations(plan).distinct.foldLeft((noop, noop, noop)) {
        case ((self, up, root), (child, selfNext, upNext, rootNext)) =>
            (
                self andThen ((parent: Plan) =>
                    upNext(parent.withChildReplaced(child,
                        selfNext(child)))),
                up andThen upNext,
```

-continued

```
            root andThen rootNext
        )
    }
    def childSanitizations(plan):
        lowestCostSanitization(plan.children).map { case (child,
        signalsToRemove) =>
            (selfTransform, upTransform, rootTransform) =
                sanitizationTransforms(child, signalsToRemove)
            (child, selfTransform, upTransform, rootTransform)
        }
    def sanitizationTransforms(plan, signalsToRemove):
        composeTransforms(
            for {
                signal <- signalsToRemove
                field <- plan.schema.fields
                transform <- field.sanitizationTransforms(signal)
            } yield transform
        )
    composeTransforms(seq):
        noop = identity[Plan] _
        seq.distinct.foldLeft((noop, noop, noop)) {
            case ((self, up, root), (selfNext, upNext, rootNext)) =>
                (self andThen selfNext, up andThen upNext, root andThen
                rootNext)
        }
    def signalRemovalCost(plan, signals):
        return cost to remove signals from plan or Infinity if not possible
    def lowestCostSanitizations(plans):
        let S be sequence (plan, signalsToRemove) for all plans
        minimize.over(S)(sum.over(S)(signalRemovalCost)) such that
            !achieveCriticality(union.over(S)(ds(plan) - signalsToRemove))
        if sum is Infinity then fail
        else return S
```

The function lowestCostSanitizations(plan) returns a sequence of (child, signalsToRemove) pairs that would allow an unsanitized plan to become sanitized using an optimization/search approach. Removing a set of signals from a plan has an associated cost, a measure similar to the cost of executing a query that a database optimizer uses to choose between alternative plans. In some embodiments, rule-based logic with naive cost estimates is used to determine costs. Other implementations take advantage of statistics and heuristics. One of skill in the art will appreciate the various techniques that can be used to determine the cost of removing a set of signals from a plan. Cost estimates can also include the cost of executing plans in different tasks.

Without loss of generality, sanitizationTransforms assumes that a schema for the data that a plan produces is available from the plan. In addition, each field can have a per signal sanitization strategy. In one implementation, a sanitization strategy is the triplet of self transform, up transform and root transform, as described above.

Transformations related to field names are renaming-oriented. Approaches may vary in their details of how useful-yet-non-critical the self transformations are and how sophisticated the heuristics of the up transforms are. One implementation of a sanitization strategy for names of data fields will now be described.

Self transform: This transform is a projection to rename the field applied to the plan. Using a database query analogy, this is the equivalent of select field_name as renamed. . . . One possible transformation is the creation of a random field name, but other strategies can use pattern matching based on the field name and/or data type, e.g., renaming a boolean has_cancer to bool_123 and sum_patients to sum_456. A specific self transform can be associated with any field. In some cases, multiple strategies are scored to select the one to be applied.

Up transform: This transform involves changing references to the original field name to the renamed name, as well as heuristic renaming of calculated fields related to the original field name, e.g., renaming has_cancer_count to bool_123_count. Within the context of a use case, all common patterns of column naming can be taken into account, including pluralization/singularization, different formatting of multi-term names (titlecase, camelcase, snakecase, dot or space separated, . . . ), e.g., things, sum_thing, sum_things, thing_sum, things_sum, thingsSum, sum.things, 'Sum Things', etc. The heuristics need not be solely based on field names as plans, and data structures used by the data source are likely to provide additional information, e.g., reference expression IDs. In addition, a data flow graph can be used to ensure that only relevant references are renamed.

Root transform: This transform reverts the renaming done by the self and up transforms. This may be done by code alone, without shared state of the fields that have been renamed, or with some shared state or other communication mechanism, e.g., a secure secret for decrypting encrypted information, which allows the root transform to act on the changes performed by the self transformer and up mutator.

Transformations related to field values can be much more diverse yet they typically share a number of common characteristics. One implementation of a sanitization strategy for values of data fields will now be described.

Self transform: The self transform is a projection applied to the value. Using a database query analogy, this is logically equivalent to select func(field_name) as field_name. . . . Self transforms can be lossless or lossy. Encryption is an example of the former while hashing is typically an example of the latter. There may be benefits to using a transformation that allows the up transform to be a no-op. Transformations may use conditional logic to handle the case where the same field contains logically different values. Transformations may require the execution of tasks before they are applied, e.g., in order to collect statistics about the data to be transformed. A number of optimizations can be applied to speed up execution of self transforms, including setting up pre-computations, etc. In some cases, the self transform preserves structures and patterns in the field values, e.g., preserving prefix ordering in strings for the first k characters, or generating multiple fields from a single one in order to allow desirable structures and patterns to be expressed in a sanitized manner.

Up transform: The up transform's behavior is defined by the need to propagate the effect of the self transform. Up transforms may use heuristics to detect possible cases of data manipulation that may be negatively affected by the self transform. For example, if an expression that attempts to parse an ICD10 code is applied to an encrypted version of an ICD10 code the results may be unpredictable. Up mutators may issue warnings, errors, generate exceptions, flag cases for human intervention or attempt plan rewrites to adapt the processing logic to the self transformer.

Root transform: In the case of lossless self transforms, the root transform is generally the inverse of the self transform. In the case of lossy self transforms, the root transform is generally either a no-op or produces a set of values, e.g., the inputs to a hash function that produced the replaced value. This can be done either by sharing some type of state or messaging between the self transformer and the root transformer or by building a lookup or rainbow table.

There are cases, e.g., encryption/decryption or reverting lookup from a secure table, in which the root transform (as well as, in some instances, the self transform) requires access to sensitive information. Rather than including this information with the plan, it may be desirable to refer to external system services, e.g., secure credentials storage, that are only available in a subset of execution environments and/or with appropriate access controls.

Once the plan sanitization algorithm is in place, plan execution and the allocation of plans to tasks, with their associated execution environments, is addressed. One embodiment of an algorithm that returns the task that executes a plan is:

```
def task(root):
    def allocateToTasks(plan):
        plan.copy(children = plan.children.map { child =>
            newChild = allocateToTasks(child)
            if (canExecuteInSameTask(plan, newChild)) newChild
            else getOrCreateTask(newChild).resultPlan
        }
    getOrCreateTask(allocateToTasks(sanitize(root)))
```

The function canExecuteInSameTask can use a number of different strategies to determine its result including, but not limited to, using the signals associated with the plans and using processing affinity, the requirement that computations with certain data happen in appropriate for the data environments. Processing affinity may be represented as a subset of signals or using a separate mechanism.

Before execution of a plan begins, the plan may be transformed for any number of reasons. Such reasons can include optimizing an aspect of execution, creating a completely different representation of the plan (e.g., via code generation), and increasing security and/or privacy by changing processing in ways that go beyond the minimum required to avoid criticality (e.g., breaking up computation across more execution environments, applying additional field name & value transformations, fuzzing, collecting detailed execution information, running "fake" tasks in execution environments, adding fake data, etc.). Another reason for transforming a plan is to introduce potentially randomized data quality and/or criticality checks (e.g., automated, such as looking for patterns in field names and/or values, or human-based, such as retrieving a sample of data and providing the sample to a human for inspection). Yet another reason is to introduce automated result criticality checks, which may include associated transformations to avoid criticality, e.g., based on k-anonymity or other measures. Note, however, that this is a markedly different and better approach than applying lossy privacy-oriented transformations to the input data.

Figure 3:
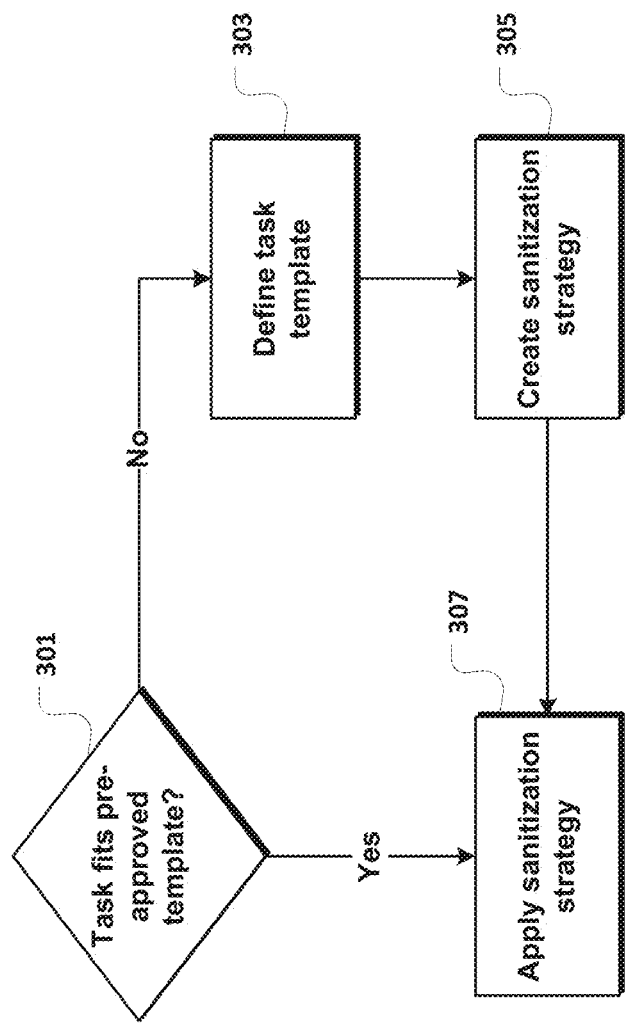
FIG. 3 depicts an example template-based technique for applying sanitization strategies to tasks.

In one implementation, avoiding criticality is achieved by transforming the structure of data processing by subdividing the universe of data processing tasks into a number of potentially overlapping regions and applying prioritized sanitization strategies. FIG. 3 depicts an example template-based technique for applying sanitization strategies to tasks. In Step 301, a determination is made as to whether a particular task fits an existing, pre-approved template. If an applicable template exists, the sanitization strategy associated with the template is applied to the task, in Step 307. If no such template exists, a new task template is defined that applies to the task, in Step 303. A sanitization strategy is then created and associated with the new task template, in Step 305. Moving to Step 307, this new sanitization strategy is then applied to the task.

When criticality cannot be provably avoided by sanitization, it can be avoided be restricting capabilities (early decision) or failing during processing (just-in-time decision). In lieu of having sufficiently advanced automatic sanitization of plans, embodiments may implement additional techniques for criticality avoidance, e.g., restricting the types of data operations, plans and/or data that are allowed to be processed by the system or introducing human workflow steps (approval, plan rewriting, etc.) into the overall process.

Without loss of generality, the result of a plan which trains a machine learning/AI model can be thought of as a function that maps future input data to model output, whether prediction, clustering or some other technique. If a self transform has been applied to one or more of its inputs during training, the same transform would have to be applied during prediction for best results. For example, if ICD10 diagnostic codes were encrypted before classifier training, they would need to be encrypted when passed as inputs during prediction. Alternatively, model output for a broad range of inputs may be computed and a new model encoded or trained from that output. Alternatively, the specification of the featurization-transformer pipeline pf the model can be re-written to perform an equivalent task. If the configuration of these transformations is highly sensitive, a model can be deployed to a secure model evaluation server, which configures these transformations through a side channel.

Example #1

Goal: List all five digit US zip codes where less than 2% of people satisfy the conditions (1) over 80 years, (2) last name Kalikashvili, and (3) has been diagnosed with cancer; include the count of people satisfying the condition per zip code. Avoid creating PHI per HIPAA.

Per HIPAA, the result of the query is not PHI as any zip code in the result would contain 50+ people matching the criteria. If the desired percentage was greater than 50% as opposed to 2%, however, it would effectively identify a person and would be considered PHI.

Using conventional techniques using joined data, both versions of the query would require critical systems because computing the result would require mixing health data with identifiable information. Using the disclosed techniques, however, the 2% query can be satisfied while avoiding criticality.

For example, consider a realistic system containing three types of isolated data, which is not Protected Health Information (PHI) per HIPAA:
(1) De-identified health data in execution environment (EE) #1.
  a. health_data: a table with primary key patient_id of summary patient health information with columns such as has_cancer and has_diabetes.
(2) Personal information in execution environment #2
  a. personal_data: a table with primary key person_id of personally identifiable information such as first_name, last_name, age and zip_code as well as various demographic & psychographic signals.
(3) Mapping table in execution environment #2.
  a. id_mapping: a table with composite primary key (person_id, patient_id). Without loss of generality, assume that all IDs are securely anonymized and match perfectly via the mapping table.

The example uses SQL-like pseudocode for its accessibility. Further, assume that there is an appropriate mechanism for accessing/moving/copying data among execution environments.

```
Task 1 EE #1: sanitize health-related information
insert into sanitized_health_data_projection
    select patient_id, has_cancer as bool_123
    from health_data
```

```
Task 2 EE #2: sanitized result
insert into sanitized_result
    with
        personal_data_projection as (
            select person_id, zip_code
            from personal_data
            where last_name = 'Kalikashvili' and age > 80
        )
        joined_data as (
            select zip_code, coalesce(bool_123, false) as bool_123
            from personal_data_projection
            join id_mapping using person_id
            left outer join sanitized_health_data_projection using
                patient_id
        )
        select zip_code, [true] as bool_123_count
        from joined_data
        pivot (
            count(zip_code)
            for bool_123 in ([true], [false])
        )
        where [true] / ([true] + [false]) < 0.02
Task 3 EE #1: final result
insert into final_result
    select zip_code, bool_123_count as has_cancer_count
    from sanitized result
```

In this case, sanitization involved removing health data semantics has_cancer by renaming it to bool_123.

It is of interest to note that embodiments of disclosed techniques can be used to produce critical results while still avoiding criticality in intermediate computations. (Task 2 would not be dealing with PHI even if the filter condition was >50% as opposed to <2%). This is desirable in cases where the recipient of the final result can deal with criticality but the processor(s) should avoid it, such as an embodiment where the recipient operates execution environment #3, which executes Task 3 above having received information about the root transform required to invert the sanitization strategy via a side channel from execution environment #1.

Example #2

Goal: Build a lookalike segment ABC from patients with the rare disease condition X. Avoid creating PHI per HIPAA.

Figure 4:
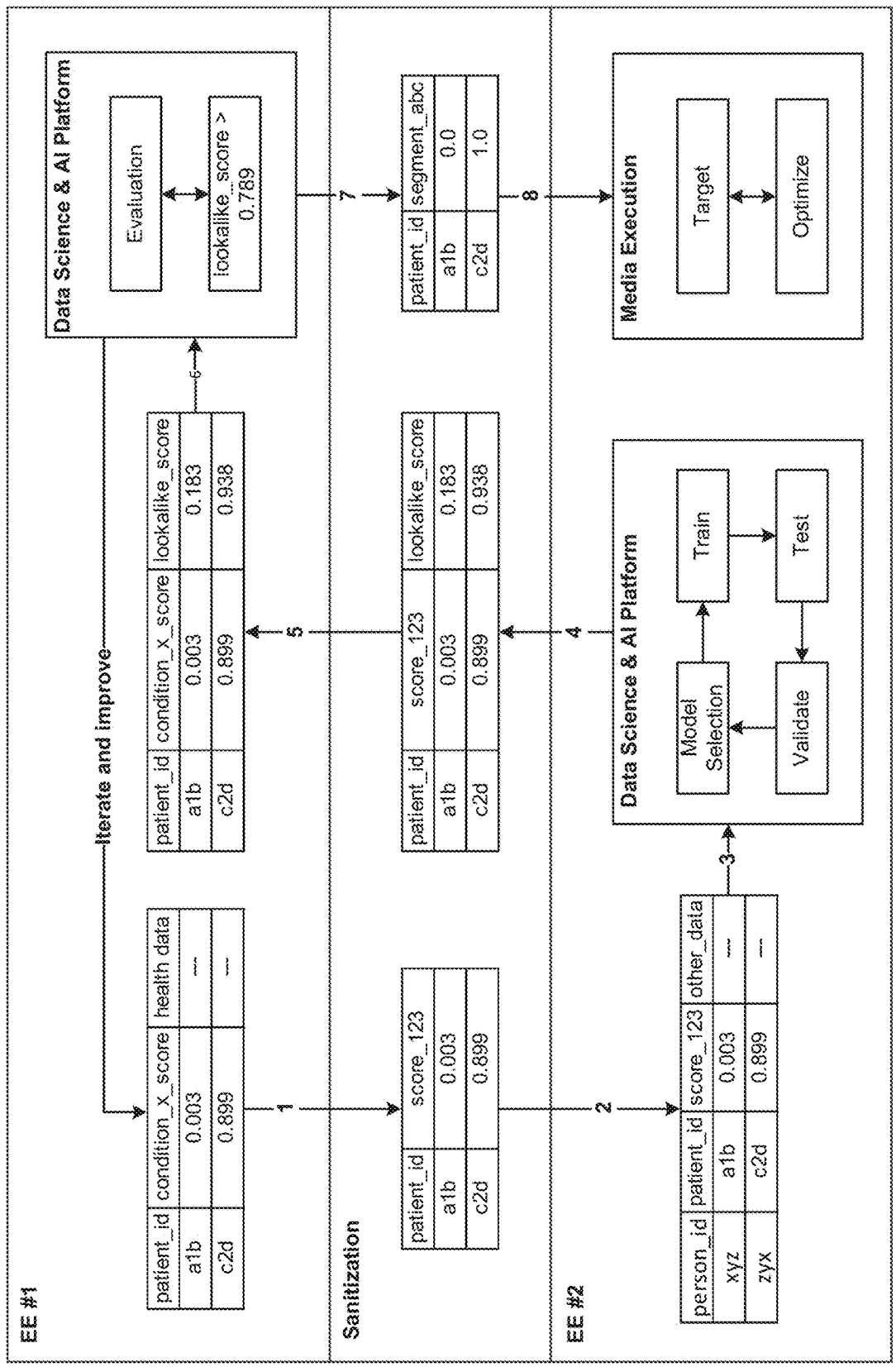
FIG. 4 depicts an example task breakdown for a data processing task that avoids criticality in execution.

FIG. 4 depicts one possible task breakdown for achieving the goal. It demonstrates how health-domain-specific, condition-X-aware model evaluation may be performed in execution environment (EE) #1 after basic ML/AI domain-independent evaluation is performed in EE #2. The sanitization layer is part of EE #1. The steps as numbered in FIG. 4 are as follows:

(1) In EE #1, sanitize condition_x_score by renaming to score_123.
(2) Move data to EE #2.
(3) Train a model using score_123 as an independent variable.
(4) Generate model predictions and move data to EE #1.
(5) Reverse sanitization strategy.
(6) Perform additional model evaluation using all the data in EE #1 and repeat steps (1)-(5) as needed.
(7) Pick a lookalike score threshold to determine which patient IDs belong in the lookalike segment. Rows not belonging to the segment may be omitted. In that case, the segment_abc column may also be omitted.
(8) Send segment information to EE #2 for media execution.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
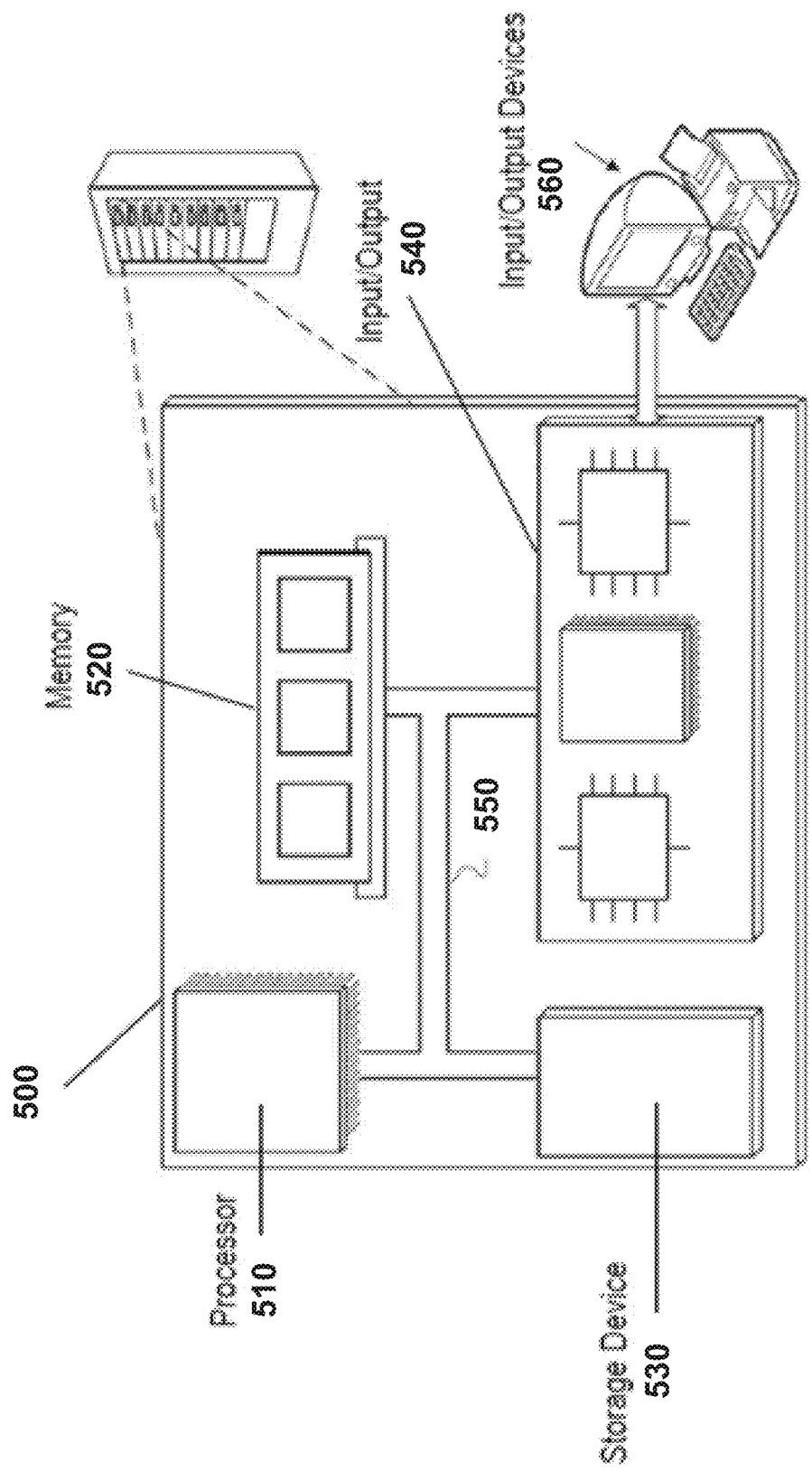
FIG. 5 depicts an example computer system for implementing the disclosed technology.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 550 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The invention claimed is:

1. A computer-implemented method comprising:
 receiving a data processing operation comprising a plurality of plans, each plan comprising a data operation having a tree-based structure comprising a root plan, at least one inner plan, and a plurality of leaf plans, wherein the data processing operation, when ordinarily executed, creates criticality at least in intermediate operations, and wherein each leaf plan in the tree-based structure is initially in a sanitized state such that execution of each such leaf plan on an individual basis does not create criticality;

determining, for each plan, whether execution of the plan creates criticality resulting from a combination of different sets of data, wherein the determining comprises identifying one or more data signals associated with the plan and determining whether a set of criticality conditions includes one or more of the data signals;

sanitizing each plan that, when executed, creates criticality, wherein the sanitizing comprises traversing the tree-based structure of the plan and transforming the plan, an ancestor of the plan, and/or a child of the plan such that execution of the plan does not create criticality; and following the sanitizing, executing each plan of the data processing operation, wherein execution of the data processing operation following the sanitizing no longer creates criticality in intermediate operations.

2. The method of claim 1, wherein data pools on which the data processing operation depends are individually absent of criticality.

3. The method of claim 1, wherein sanitizing a plan comprises:
(a) determining a cost to remove from the plan each data signal associated with the plan that is included in the set of criticality conditions; and
(b) identifying a permutation of the data signals from step (a) that, when removed from the plan, sanitize the plan at a lowest cost compared to other permutations of the data signals.

4. The method of claim 1, wherein sanitizing a plan comprises applying to the plan at least one transform operation in a set of transform operations, the set of transform operations being associated with (1) a data field in the plan to be transformed and (2) a data signal to be removed from the plan.

5. The method of claim 4, wherein the set of transform operations comprises (1) a self transform in which a plan is transformed without transforming children of the plan, (2) an up transform in which each ancestor of the plan is transformed without transforming children of the plan, and/or (3) a root transform in which one or more transformations are reverted.

6. The method of claim 5, wherein sanitizing a plan further comprises performing a self transform on a name of the data field, the self transform comprising renaming the name of the data field in the plan to create a renamed data field in the plan.

7. The method of claim 6, wherein sanitizing a plan further comprises performing an up transform on a name of the data field, the up transform comprising changing, in each ancestor of the plan, each reference to the name of the data field to a reference to the renamed data field.

8. The method of claim 7, wherein sanitizing a plan further comprises performing a root transform on a name of the data field, the root transform comprising reverting renaming and reference changing operations performed by the self transform and up transform of the plan.

9. The method of claim 5, wherein sanitizing a plan further comprises performing a self transform on a value of the data field, the self transform comprising applying a lossless or lossy projection to the value of the data field in the plan.

10. The method of claim 9, wherein sanitizing a plan further comprises performing an up transform on a value of the data field, the up transform comprising identifying operations in ancestors of the plan that are potentially negatively affected by the self transform on the value of the data field.

11. The method of claim 10, wherein sanitizing a plan further comprises performing a root transform on a value of the data field, the root transform comprising either (1) reverting a lossless projection applied by the self transform of the plan, (2) no operation, or (3) producing a set of values associated with a lossy projection applied by the self transform of the plan.

12. The method of claim 1, wherein execution of a first plan comprises training a data model, wherein the first plan is sanitized by applying a first transformation to inputs that are used for training the data model, and wherein execution of a second plan comprises:
using the data model to provide a prediction; and
applying the first transformation to inputs that are used by the data model to provide the prediction.

13. A system comprising:
a processor; and
a memory storing computer-executable instructions that, when executed by the processor, program the processor to perform the operations of:
receiving a data processing operation comprising a plurality of plans, each plan comprising a data operation having a tree-based structure comprising a root plan, at least one inner plan, and a plurality of leaf plans, wherein the data processing operation, when ordinarily executed, creates criticality at least in intermediate operations, and wherein each leaf plan in the tree-based structure is initially in a sanitized state such that execution of each such leaf plan on an individual basis does not create criticality;
determining, for each plan, whether execution of the plan creates criticality resulting from a combination of different sets of data, wherein the determining comprises identifying one or more data signals associated with the plan and determining whether a set of criticality conditions includes one or more of the data signals;
sanitizing each plan that, when executed, creates criticality, wherein the sanitizing comprises traversing the tree-based structure of the plan and transforming the plan, an ancestor of the plan, and/or a child of the plan such that execution of the plan does not create criticality; and
following the sanitizing, executing each plan of the data processing operation, wherein execution of the data processing operation following the sanitizing no longer creates criticality in intermediate operations.

14. The system of claim 13, wherein data pools on which the data processing operation depends are individually absent of criticality.

15. The system of claim 13, wherein sanitizing a plan comprises:
(a) determining a cost to remove from the plan each data signal associated with the plan that is included in the set of criticality conditions; and
(b) identifying a permutation of the data signals from step (a) that, when removed from the plan, sanitize the plan at a lowest cost compared to other permutations of the data signals.

16. The system of claim 13, wherein sanitizing a plan comprises applying to the plan at least one transform operation in a set of transform operations, the set of transform operations being associated with (1) a data field in the plan to be transformed and (2) a data signal to be removed from the plan.

17. The system of claim 16, wherein the set of transform operations comprises (1) a self transform in which a plan is transformed without transforming children of the plan, (2) an up transform in which each ancestor of the plan is transformed without transforming children of the plan, and/or (3) a root transform in which one or more transformations are reverted.

18. The system of claim 17, wherein sanitizing a plan further comprises performing a self transform on a name of the data field, the self transform comprising renaming the name of the data field in the plan to create a renamed data field in the plan.

19. The system of claim 18, wherein sanitizing a plan further comprises performing an up transform on a name of the data field, the up transform comprising changing, in each ancestor of the plan, each reference to the name of the data field to a reference to the renamed data field.

20. The system of claim 19, wherein sanitizing a plan further comprises performing a root transform on a name of the data field, the root transform comprising reverting renaming and reference changing operations performed by the self transform and up transform of the plan.

21. The system of claim 17, wherein sanitizing a plan further comprises performing a self transform on a value of the data field, the self transform comprising applying a lossless or lossy projection to the value of the data field in the plan.

22. The system of claim 21, wherein sanitizing a plan further comprises performing an up transform on a value of the data field, the up transform comprising identifying operations in ancestors of the plan that are potentially negatively affected by the self transform on the value of the data field.

23. The system of claim 22, wherein sanitizing a plan further comprises performing a root transform on a value of the data field, the root transform comprising either (1) reverting a lossless projection applied by the self transform of the plan, (2) no operation, or (3) producing a set of values associated with a lossy projection applied by the self transform of the plan.

24. The system of claim 13, wherein execution of a first plan comprises training a data model, wherein the first plan is sanitized by applying a first transformation to inputs that are used for training the data model, and wherein execution of a second plan comprises:

using the data model to provide a prediction; and
 applying the first transformation to inputs that are used by the data model to provide the prediction.

\* \* \* \* \*